(12) United States Patent
Yanagi et al.

(10) Patent No.: US 10,754,589 B2
(45) Date of Patent: Aug. 25, 2020

(54) TERMINAL DEVICE AND COMMUNICATION SYSTEM

(71) Applicant: FUJITSU COMPONENT LIMITED, Tokyo (JP)

(72) Inventors: Masahiro Yanagi, Tokyo (JP); Sumio Watanabe, Tokyo (JP); Takeshi Wakui, Tokyo (JP); Toshiya Koyama, Tokyo (JP); Tatsuya Oguchi, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 16/381,221

(22) Filed: Apr. 11, 2019

(65) Prior Publication Data

US 2019/0317704 A1 Oct. 17, 2019

(30) Foreign Application Priority Data

Apr. 17, 2018 (JP) .................................. 2018-078888

(51) Int. Cl.
*G06F 3/12* (2006.01)
*G06F 3/0488* (2013.01)
*H04M 1/725* (2006.01)

(52) U.S. Cl.
CPC .......... *G06F 3/1204* (2013.01); *G06F 3/0488* (2013.01); *G06F 3/1229* (2013.01); *H04M 1/7253* (2013.01); *G06F 3/1292* (2013.01)

(58) Field of Classification Search
CPC ..... G06F 3/0488; G06F 3/1292; G06F 3/1229
See application file for complete search history.

(56) References Cited

U.S. PATENT DOCUMENTS

| 5,699,494 A | * | 12/1997 | Colbert | G06F 3/1204 |
| | | | | 358/1.15 |
| 2005/0197158 A1 | * | 9/2005 | Silverbrook | B41J 3/445 |
| | | | | 455/556.2 |
| 2009/0091597 A1 | | 4/2009 | Silverbrook et al. | |
| 2010/0259491 A1 | * | 10/2010 | Rajamani | H04M 1/72527 |
| | | | | 345/173 |
| 2014/0091623 A1 | * | 4/2014 | Shippy | H02J 7/342 |
| | | | | 307/31 |
| 2017/0285813 A1 | * | 10/2017 | Threlkeld | G06F 3/0484 |
| 2017/0300634 A1 | * | 10/2017 | Chiang | G06Q 50/24 |
| 2018/0067638 A1 | * | 3/2018 | Klein | G06F 1/1652 |

FOREIGN PATENT DOCUMENTS

| EP | 2701057 | 2/2014 |
| JP | 2006-159427 | 6/2006 |

* cited by examiner

*Primary Examiner* — King Y Poon
*Assistant Examiner* — Michael Burleson
(74) *Attorney, Agent, or Firm* — IPUSA, PLLC

(57) ABSTRACT

A terminal device includes an operation part, a touching part, a communication module, and a retrieval module. The retrieval module is configured to retrieve an object displayed on a first apparatus equipped with a touch panel from the first apparatus, in response to the operation part being operated while the object is selected by the touching part.

5 Claims, 17 Drawing Sheets

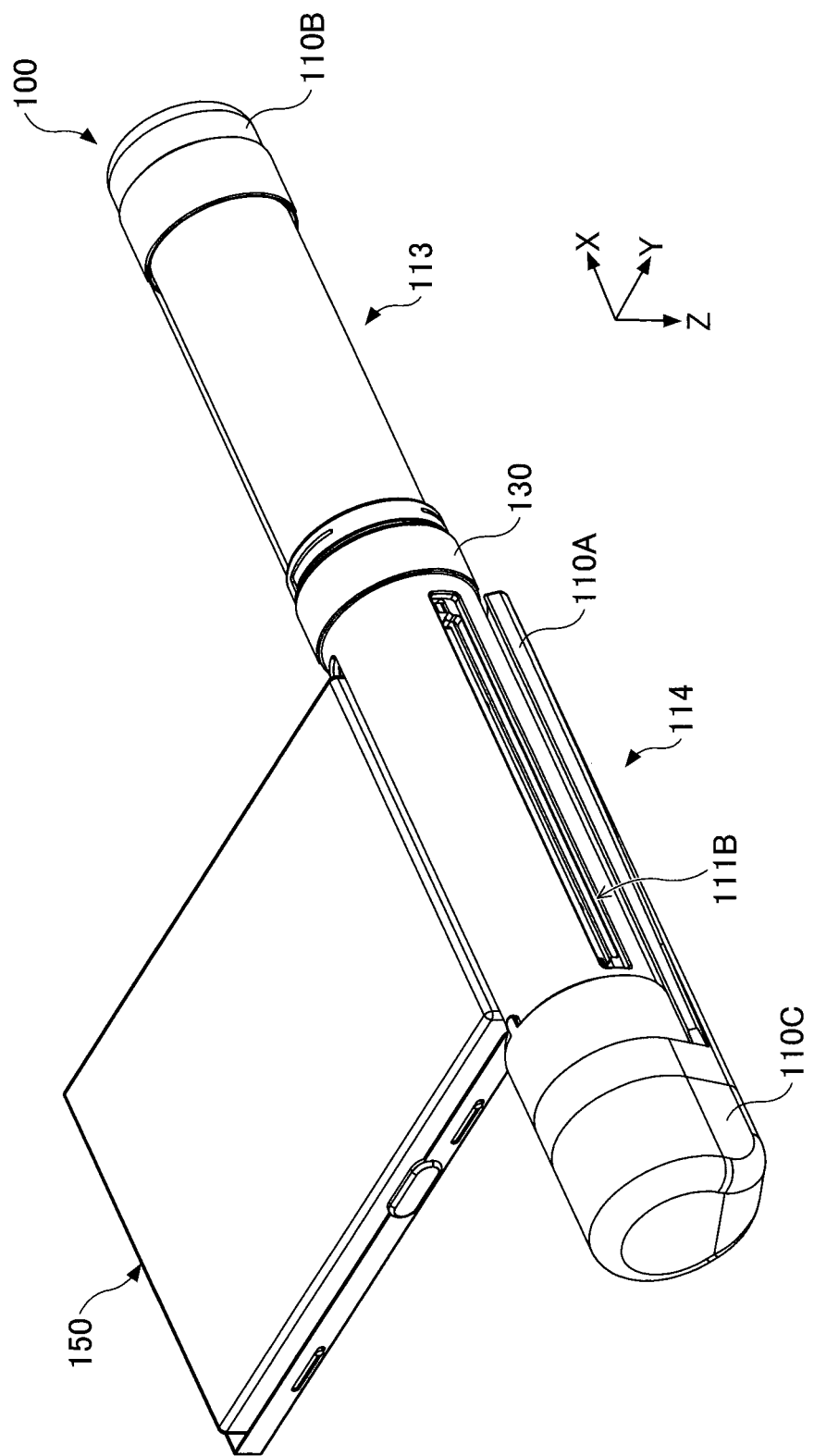

FIG.5
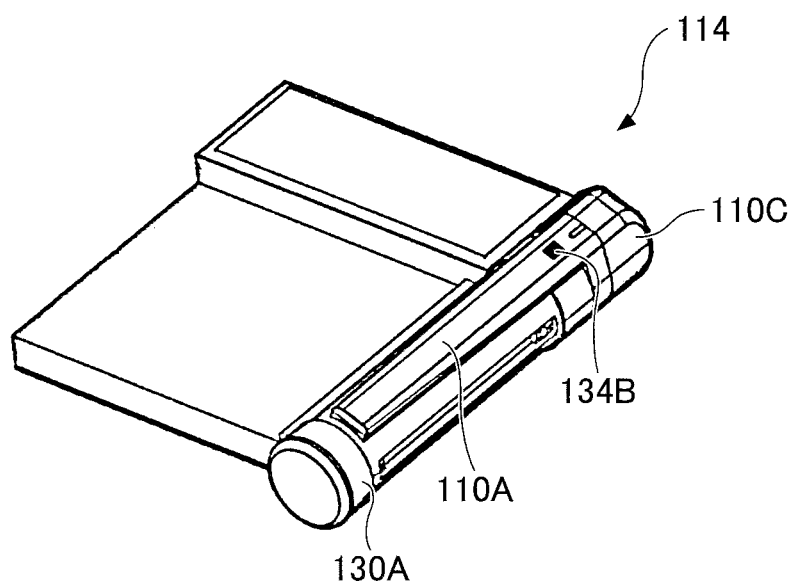
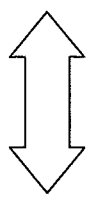
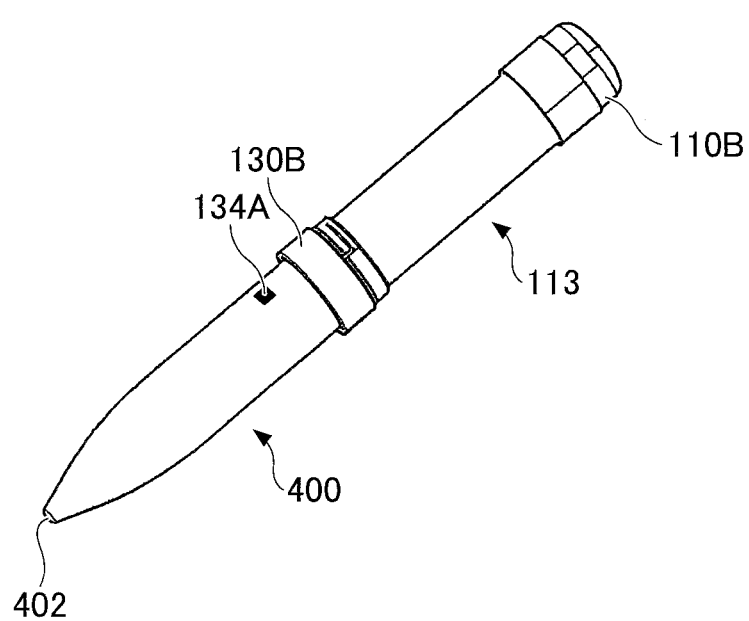

TERMINAL DEVICE AND COMMUNICATION SYSTEM

CROSS-REFERENCE TO RELATED APPLICATIONS

This application is based upon and claims priority to Japanese Patent Application No. 2018-078888 filed on Apr. 17, 2018, the entire contents of which are incorporated herein by reference.

BACKGROUND OF THE INVENTION

1. Field of the Invention

The present disclosure relates to a terminal device and a communication system.

2. Description of the Related Art

A small-sized mobile printer in which a user can print at a place of visit and the like has been known (see Patent Document 1, for example).

However, a complex operation needs to be performed on an external information processing apparatus in order to transmit print data to the mobile printer. Further, an object acquired from an external apparatus cannot be used for a purpose other than printing.

RELATED-ART DOCUMENTS

Patent Document

[Patent Document 1] Japanese Laid-Open Patent Publication No. 2006-159427

SUMMARY OF THE INVENTION

In order to solve the aforementioned problems, the present invention aims at providing a method of acquiring an object easily and utilizing the acquired object for various purposes.

In order to solve the aforementioned problems, a terminal device according to one aspect of the present invention includes an operation part, a touching part, a communication module, and a retrieval module. The retrieval module is configured to retrieve an object displayed on a first apparatus from the first apparatus, in response to the operation part being operated while the object is selected by the touching part.

BRIEF DESCRIPTION OF THE DRAWINGS

FIG. 4 is an external perspective view of the terminal device to which a cassette is attached;

FIG. 5 is a diagram of a divided state of the terminal device according to the embodiment;

DESCRIPTION OF THE EMBODIMENTS

In the following, an embodiment of the present disclosure will be described.

Figure 1:
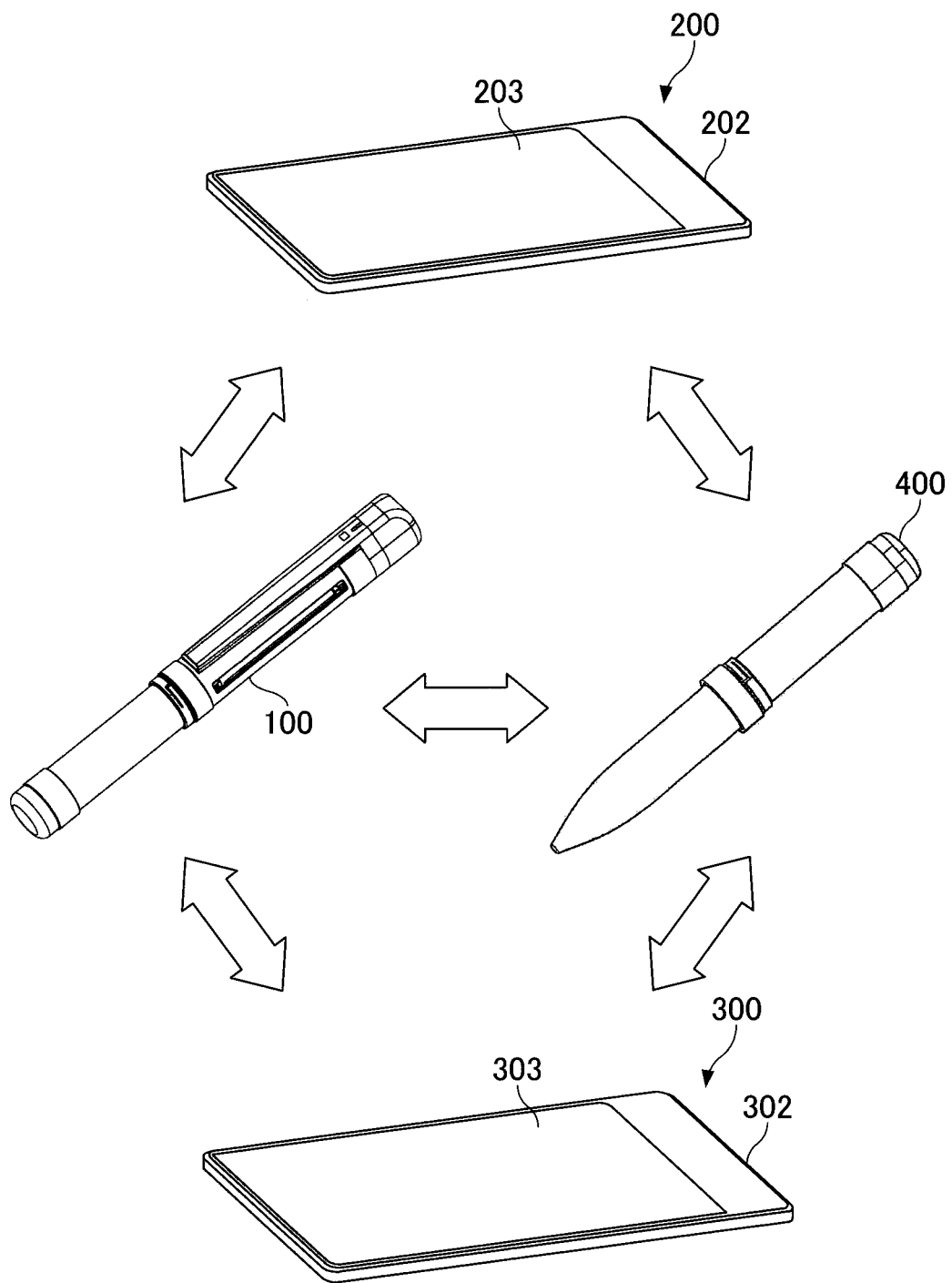
FIG. 1 is a diagram illustrating a communication system according to an embodiment.

FIG. 1 illustrates a communication system 10 according to the present embodiment. The communication system 10 includes a terminal device 100, a smartphone 200, a smartphone 300, and a stylus 400. The terminal device 100 and the stylus 400 can perform wireless communication with the smartphones 200 and 300 using Bluetooth Low Energy (BLE). In the following, the smartphone 200 is a first device which is a source device of an object to be acquired by the terminal device 100 or the stylus 400, and the smartphone 300 is a second device which is a destination device of an object to be output by the terminal device 100 or the stylus 400. However, the terminal device 100 and the stylus 400 can also output an object acquired from the smartphone 300 to the smartphone 200. Further, a third device having the same functions as the terminal device 100 can be designated as a destination device to print an object, and the terminal device 100 or the stylus 400 can output the object to the third device to print the object. The terminal device 100 and the stylus 400 may be collectively referred to as a "terminal device 100a".

By touching a touch panel 203 provided at a main unit 202 of the smartphone 200, the terminal device 100a can acquire an object selected on the touch panel 203. The terminal device 100a can also move or rotate an object displayed on the touch panel 203. Further, the terminal device 100a can cause the smartphone 300 to display an object acquired from the smartphone 200 at a location on a touch panel 303 provided at a main unit 302 of the smartphone 300, which is selected by a touch operation to the touch panel 303.

The terminal device 100 also has a printing function. The terminal device 100 may print an object acquired from the smartphone 200 on a recording sheet. Further, the terminal device 100a can download data from the smartphones 200 and 300, and upload the data to the smartphones 300 and 200. By performing these operations, the terminal device 100a can share various types of data with the smartphones 200 and 300.

Figure 2A:
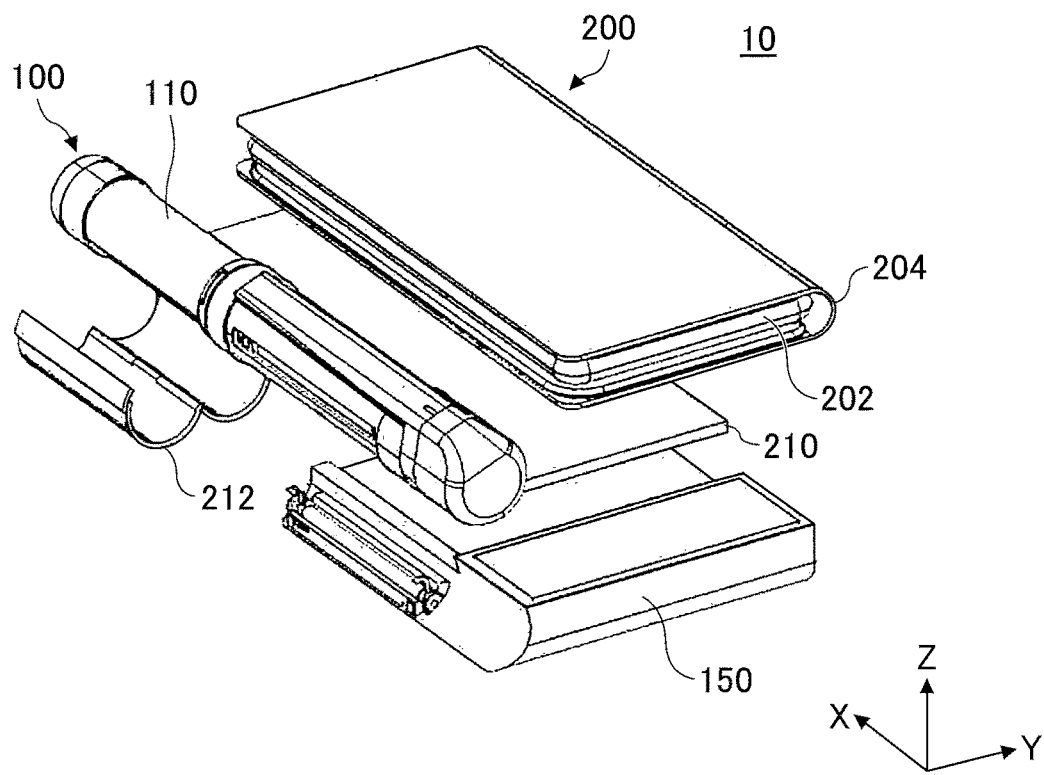
FIGS. 2A and 2B are diagrams illustrating perspective views of a terminal device and a smartphone.
Figure 2B:
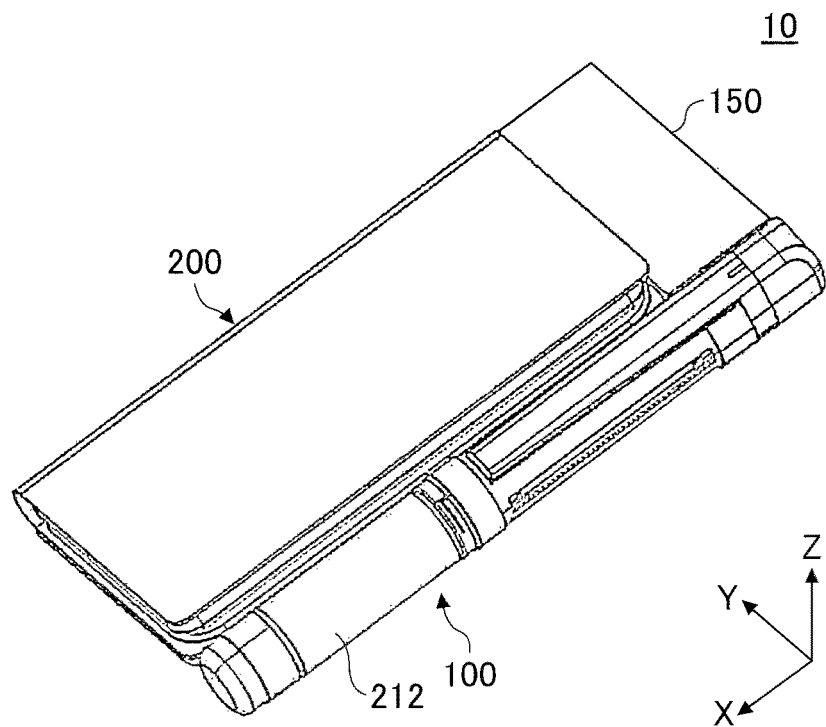

FIG. 2A is a perspective view of the terminal device 100 and the smartphone 200 that are separated. FIG. 2B is a perspective view of the terminal device 100 and the smartphone 200 coupled with each other. In the following, a longitudinal direction of the smartphone 200 is referred to as an X-direction, a short dimension direction of the smartphone 200 is referred to as a Y-direction, and a thickness direction of the smartphone 200 is referred to as a Z-direction.

As illustrated in FIG. 2A and FIG. 2B, the terminal device 100 is detachable with respect to the smartphone 200, and can be carried with the smartphone 200 while the terminal device 100 is attached. As illustrated in FIG. 2A, the terminal device 100 is attached to the smartphone 200 with a binder 210. The smartphone 200 includes the main unit 202 and a jacket 204 attached to the main unit 202 so as to cover the main unit 202. The binder 210 can be attached to a back of the jacket 204 by a fixing means such as an adhesive agent. On a longer edge at −Y side of the binder 210, a cylindrical holder 212 is provided. The holder 212 is openable. The terminal device 100 is set to the opened holder 212 as illustrated in FIG. 2A, and the holder 212 is closed as illustrated in FIG. 2B to securely hold the terminal device 100. An inner diameter of the holder 212 is substantially equal to an outer diameter of a housing 110 of the terminal device 100. Accordingly, the holder 212 can hold the terminal device 100 without wobbling. Further, as illustrated in FIG. 2B, an expansion cassette 150 (may also be referred to as a "cassette 150") and a built-in battery can be attached to the terminal device 100, while the terminal device 100 is attached to the smartphone 200. By attaching the cassette 150 to the terminal device 100, the terminal device 100 can perform a print operation.

Figure 3A:
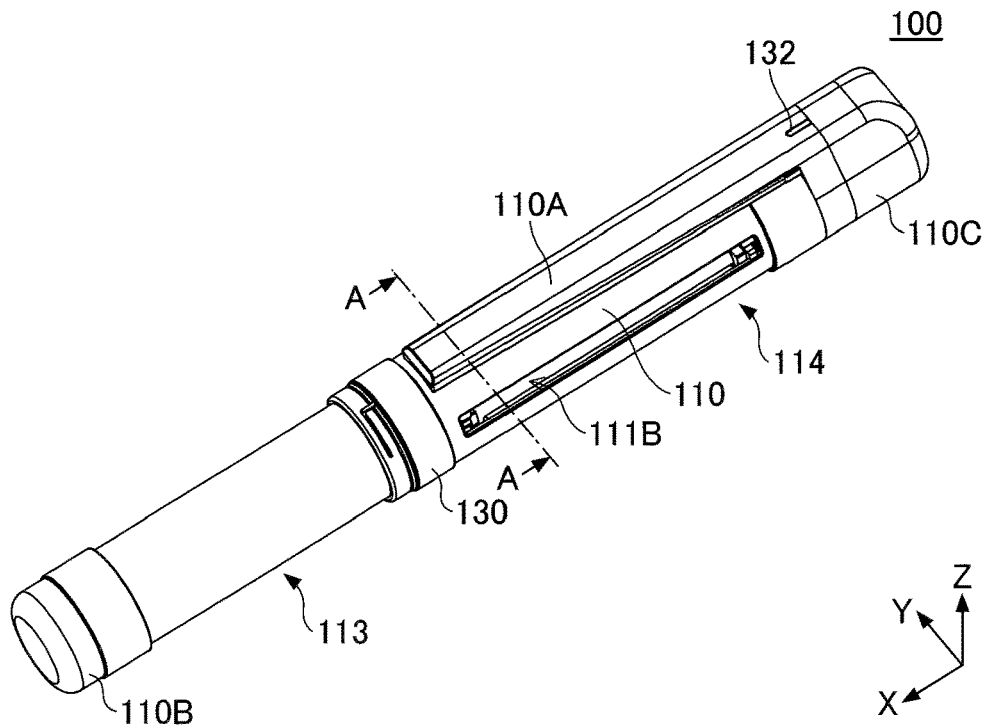
FIGS. 3A and 3B are diagrams illustrating an external perspective view and a cross-sectional view of the terminal device according to the embodiment.

FIG. 3A is an external perspective view of the terminal device 100. The pen-type terminal device 100 is a portable IoT (Internet of Things) device. The terminal device 100 includes the printing function and a wireless communication function. For example, the terminal device 100 is approximately 18 mm to 20 mm in diameter, and approximately 165 mm to 170 mm in length. As illustrated in FIG. 3A, the terminal device 100 has the housing 110. A hook 110A is provided on the housing 110. Thus, the terminal device 100 can be held at a user's pocket provided at the user's chest by the hook 110A, similar to a pen. A cylindrical dial switch 130 is provided at an outer circumference of the housing 110. By operating the dial switch 130, a user can perform various operations of the terminal device 100, such as turning-on and turning-off operations of the terminal device 100, and an operation mode switching operation. The dial switch 130 can be pressed and rotated. An indicator 132 is provided on the hook 110A. By lighting of the indicator 132, various states of the terminal device 100 can be represented, such as a power supply state, a printing state, and the operation mode. For example, a light emitting diode (LED) is used as the indicator 132. A detachable cap 110B is provided at +X end of the housing 110 and a detachable cap 110C is provided at the other end of the housing 110. The terminal device 100 includes a power supply unit 113 and a printer unit 114. The printer unit 114 operates by using power supplied from the power supply unit 113 when the power supply unit 113 is connected. When the cassette 150 is connected to the printer unit 114, the printer unit 114 operates by power supplied from the cassette 150. The power supply unit 113 may be connected to the stylus 400 when the power supply unit 113 is disconnected from the printer unit 114.

Figure 3B:
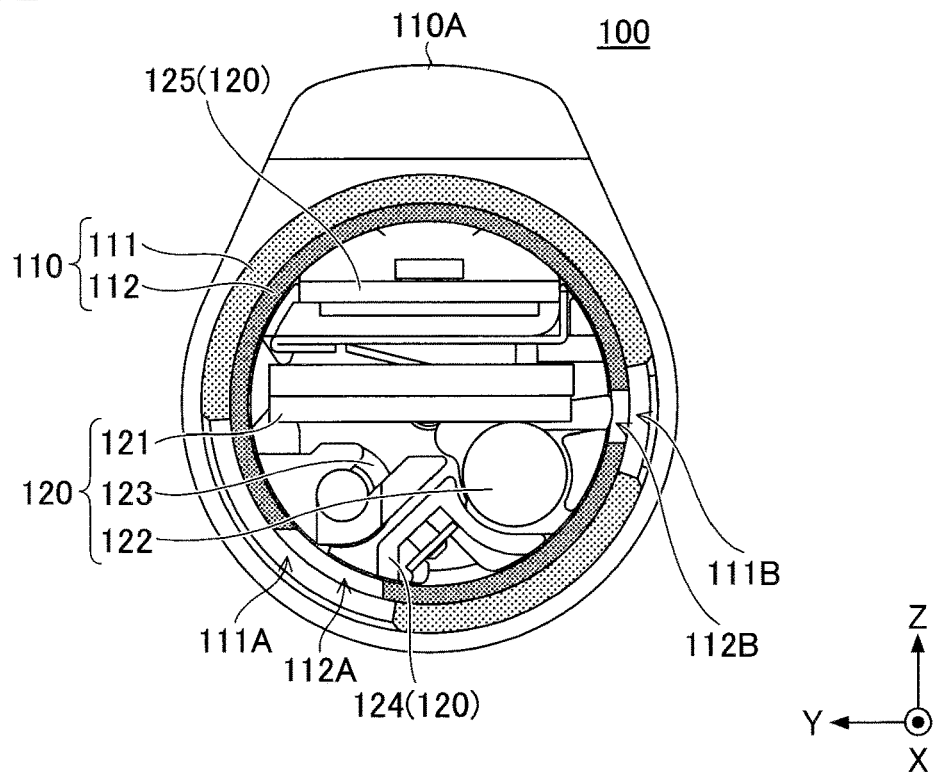

FIG. 3B is a cross-sectional view of the terminal device 100 taken along a line A-A in FIG. 3A. The housing 110 includes an outer cylinder 111 and an inner cylinder 112. The inner cylinder 112 is inserted to the outer cylinder 111, and the outer cylinder 111 is rotatable with respect to the inner cylinder 112. A sheet inlet 111A and a sheet outlet 111B are formed on the outer cylinder 111 and a sheet inlet 112A and a sheet outlet 112B are formed on the inner cylinder 112.

A printing mechanism 120 is provided inside the inner cylinder 112 as illustrated in FIG. 3B. The printing mechanism 120 is an example of, and is referred to as a "print unit". The print unit 120 is a thermal printer that prints on a recording sheet supplied from the cassette 150. The print unit 120 includes a thermal head 121, a platen roller 122, a feed roller 123, a sheet guide 124, and a controller 125.

The thermal head 121 includes multiple heating elements arranged side-by-side in the X-direction. The platen roller 122 is provided at a location facing the thermal head 121. As a recording sheet is sandwiched between the platen roller 122 and the thermal head 121, the recording sheet is pressed against the thermal head 121. The thermal head 121 heats the heating elements in accordance with control signals supplied from the controller 125 to form an image on a recording sheet.

A recording sheet fed from the sheet inlet 111A and the sheet inlet 112A is fed to a gap between the thermal head 121 and the platen roller 122 along with the sheet guide 124 by rotating the feed roller 123.

The controller 125 includes a head actuator and a motor actuator. The head actuator controls actuation of the thermal head 121 by supplying print data from a CPU (Central Processing Unit) 801 to the thermal head 121. The motor actuator controls actuation of a motor for sheet feeding based on motor control data from the CPU 801.

(Attaching Cassette 150)

FIG. 4 is an external perspective view of the terminal device 100 to which the cassette 150 is attached. When performing a print operation using the terminal device 100, a user rotates the outer cylinder 111 with respect to the inner cylinder 112 such that the sheet inlet 111A is aligned with the sheet inlet 112A and the sheet outlet 111B is aligned with the sheet outlet 112B, as illustrated in FIG. 3B. Also, as illustrated in FIG. 4, the user may attach the cassette 150 to the sheet inlet 111A. As a result, a recording sheet can be fed from the cassette 150 to the print unit 120 through the sheet inlet 111A and the sheet inlet 112A. The recording sheet is fed out of the print unit 120 through the sheet outlet 111B and the sheet outlet 112B. The cassette 150 can store multiple recording sheets inside. An example of a recording sheet is a label sheet of A8 size (52 mm×74 mm). Thus, a user can immediately stick a label printed by the terminal device 100 on a notebook or the like.

FIG. 5 illustrates the terminal device 100. The terminal device 100 can be divided into the power supply unit 113 and the printer unit 114. The power supply unit 113 can be connected to the stylus 400. The stylus 400 includes a dial switch 130B, the power supply unit 113, and the cap 110B. The printer unit 114 includes the hook 110A, the cap 110C, the print unit 120, and the dial switch 130A. The stylus 400 operates by power supplied from the power supply unit 113. An antenna 134A is provided at the stylus 400, and an antenna 134B is provided at the printer unit 114. The stylus 400 acquires an object from an external device through a touching operation on a touch panel of the external device using a tip 402 of the stylus 400, and transmits the acquired object to the printer unit 114 through wireless communication. The printer unit 114 operates by power supplied from the cassette 150. The printer unit 114 prints the object transmitted from the stylus 400.

Figure 6:
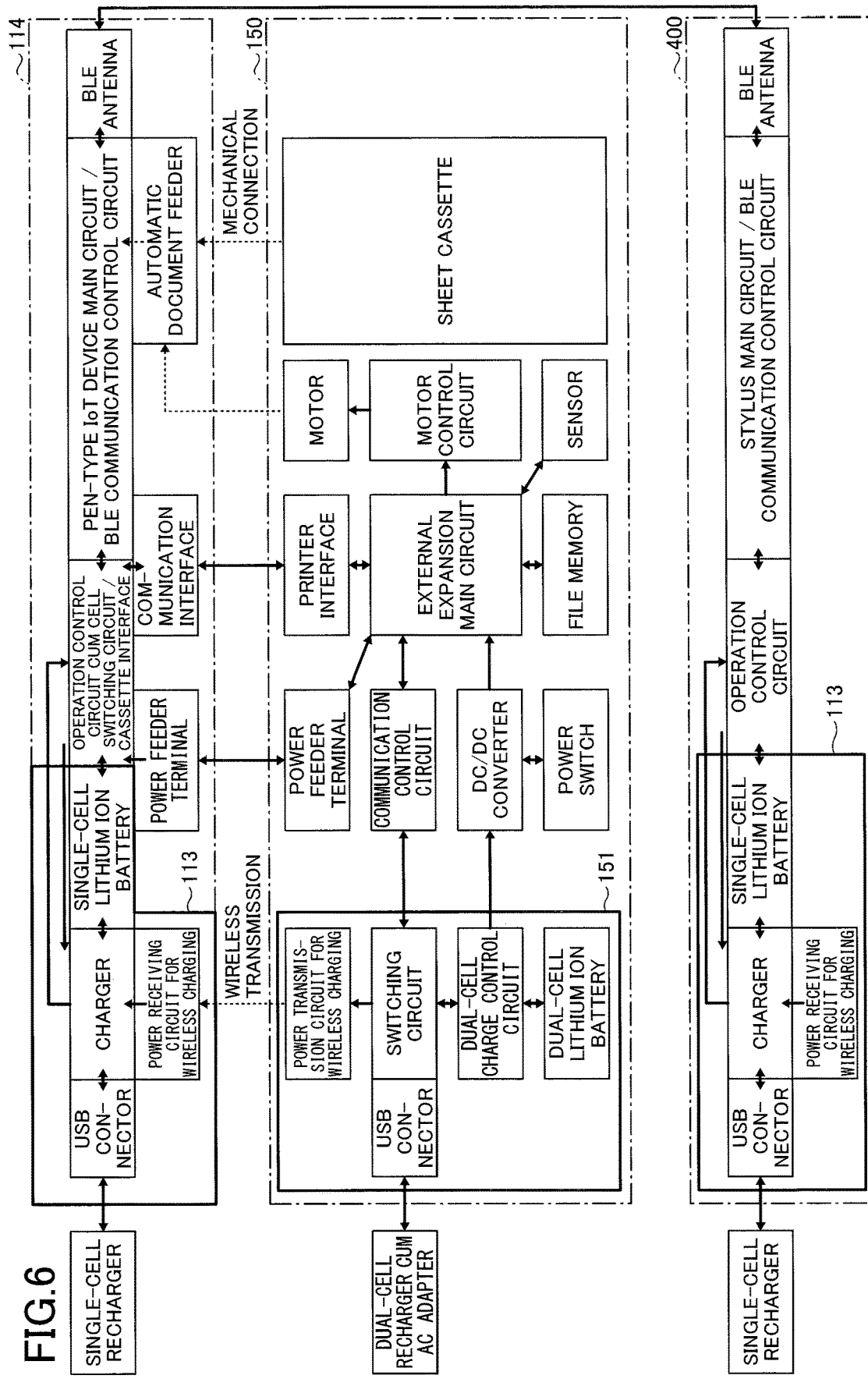
FIG. 6 is a block diagram illustrating a stylus attached to the terminal device and the cassette.
Figure 7:
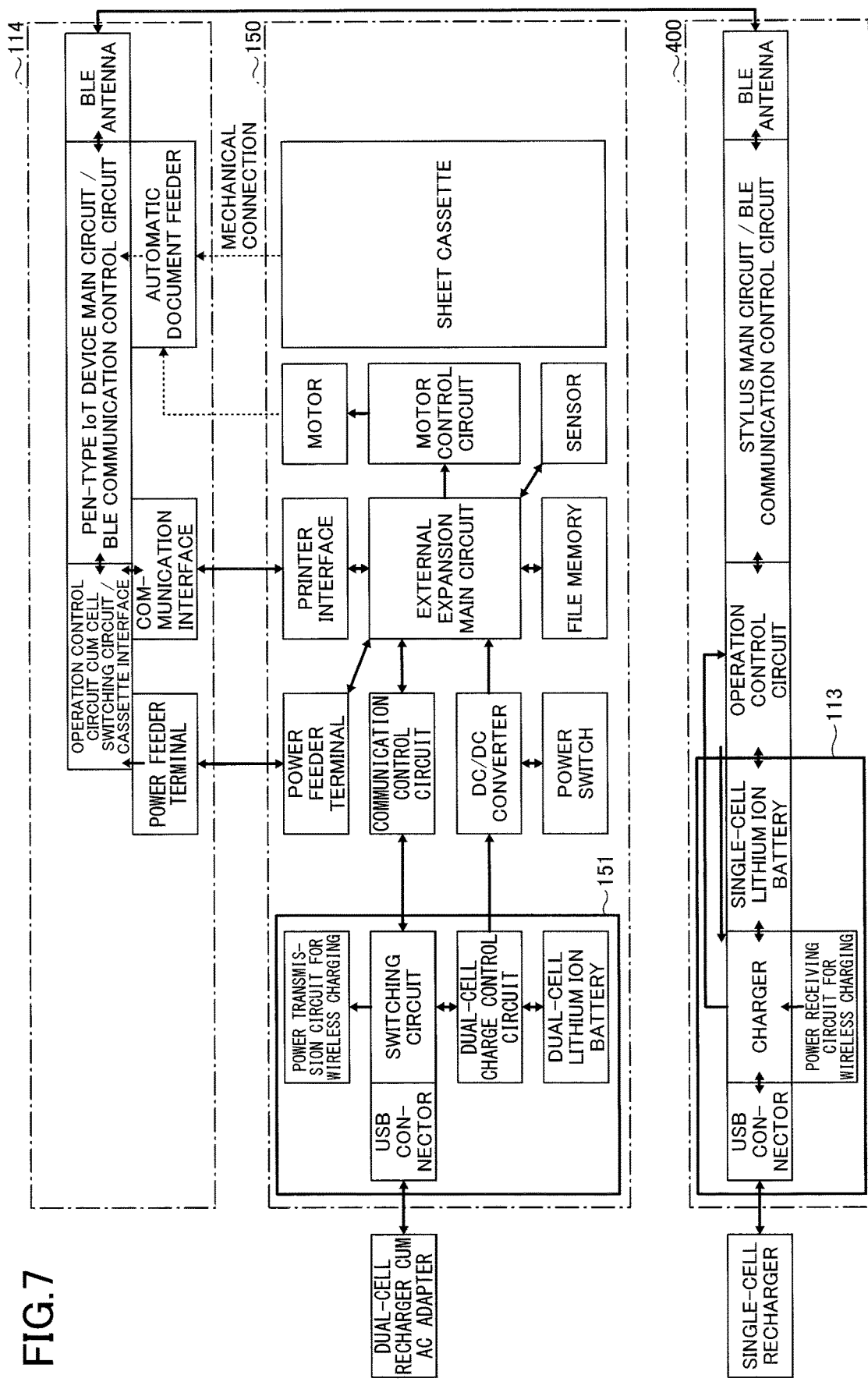
FIG. 7 is a block diagram illustrating a case in which the stylus is separated.

FIG. 6 is a block diagram illustrating the stylus 400 attached to the terminal device 100 and the cassette 150. FIG. 7 illustrates a block diagram of the separated stylus 400.

In FIG. 6, both the stylus 400 and the terminal device 100 connected to the cassette 150 are used. In FIG. 6, as the power supply units 113 are connected to the printer unit 114 and the stylus 400 respectively, the printer unit 114 and the stylus 400 can operate by using electric power supplied from the power supply units 113.

In FIG. 7, the power supply unit 113 is only connected to the stylus 400. Thus, only the stylus 400 operates by using electric power supplied from the power supply unit 113. The printer unit 114 operates by using electric power supplied from a power supply provided in the cassette 150 attached to the printer unit 114.

In both FIG. 6 and FIG. 7, the cassette 150 is attached to the printer unit 114. Thus, the printer unit 114 can operate by using electric power supplied from a power supply 151 in the cassette 150. The power supply unit 113 connected to the printer unit 114 and the power supply unit 113 connected to the stylus 400 in FIG. 6 are mutually independent modules, although both have the same functions.

Figure 8:
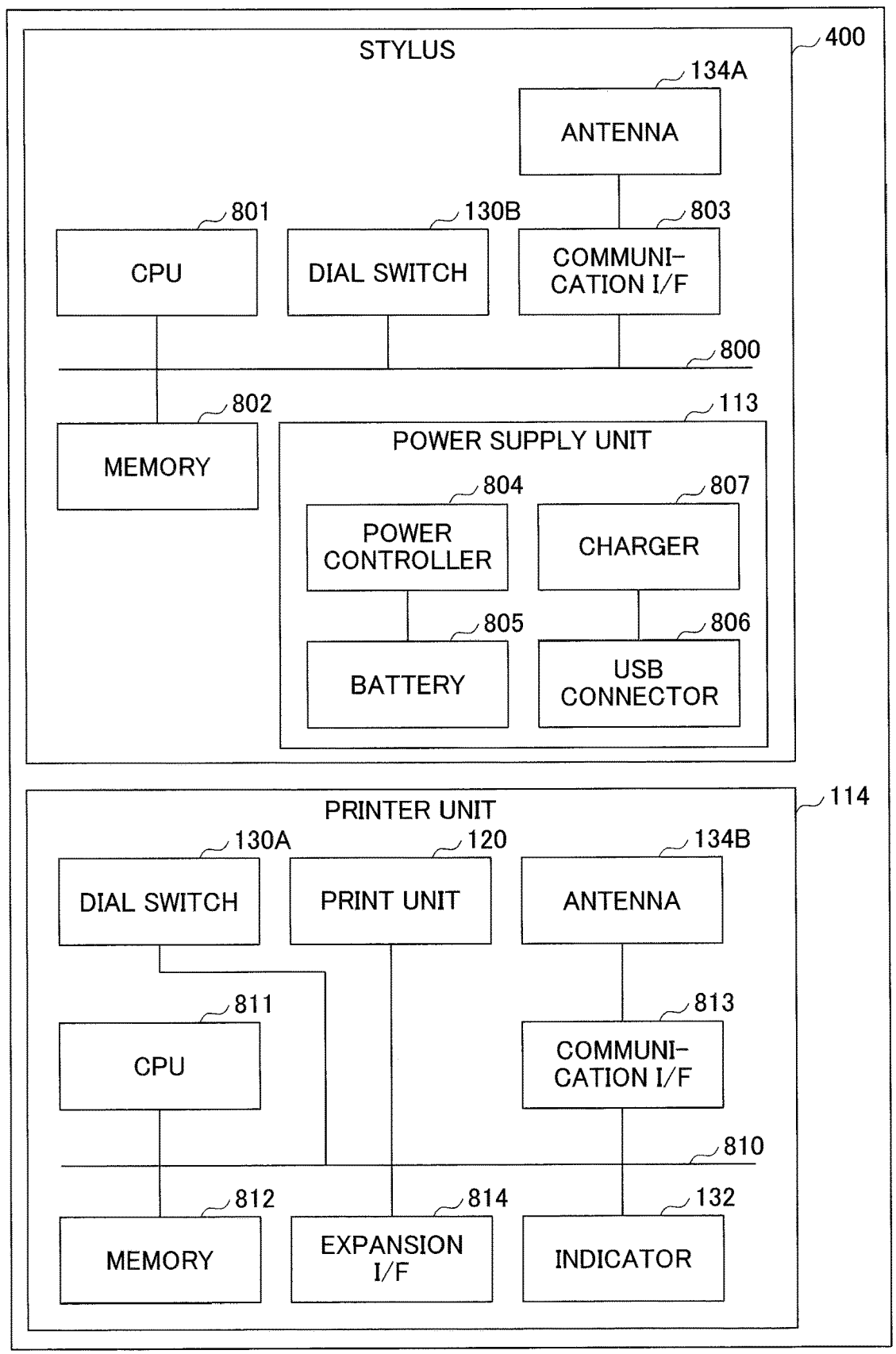
FIG. 8 is a block diagram illustrating a hardware configuration of a printer unit, the stylus, and a power supply unit.

In the present embodiment, the stylus 400 is an example of a "first main unit", and the printer unit 114 is an example of a "second main unit". A set of the terminal device 100 and the stylus 400 is an example of a "terminal device". Both the stylus 400 and the terminal device 100 have similar functions except for a printing function. FIG. 8 is a block diagram illustrating a hardware configuration of the printer unit 114, the stylus 400, and the power supply unit 113. The stylus 400 includes the CPU 801, a memory 802, and a communication I/F (interface) 803, in addition to the antenna 134A and the dial switch 130B. Each of these components is interconnected via a bus 800.

The CPU 801 executes programs stored in the memory 802, and controls operations of the stylus 400. The memory 802 stores the programs, and data necessary for the CPU 801 executing the programs. Examples of the memory 802 include a ROM (Read Only Memory) and a RAM (Random Access Memory).

The communication I/F 803 controls wireless communication. In the present embodiment, a communication protocol used by the communication I/F 803 is BLE. However, a communication protocol is not limited to BLE, and Wi-Fi or NFC (Near Field Communication) may be used.

The power supply unit 113 includes a power controller 804, a battery 805, a USB connector 806, and a charger 807. The power controller 804 is interposed between the battery 805 and the printer unit 114, or between the battery 805 and the stylus 400, and controls power supply to the printer unit 114 or the stylus 400 in accordance with an operation of the dial switch 130. By operating the dial switch 130A or 130B, the power controller 804 can switch the printer unit 114 or the stylus 400 between a power-on state and a power-off state. The battery 805 supplies direct-current electric power to the printer unit 114 or the stylus 400. In the present embodiment, a secondary cell, such as a lithium ion battery, a lithium-ion polymer battery, and a nickel-hydrogen battery, is used as the battery 805. However, a primary cell such as a silver-oxide battery and a lithium battery may be used. The USB connector 806 is used for connecting a recharger. By detaching the cap 110B, the USB connector 806 is exposed. The charger 807 charges the battery 805 using electric power supplied from a recharger via the USB connector 806.

The printer unit 114 includes a CPU 811, a memory 812, a communication I/F 813, and an expansion I/F 814, in addition to the print unit 120, the dial switch 130A, the indicator 132, and the antenna 134B. Each of these components is interconnected via a bus 810. The CPU 811 executes programs stored in the memory 812, and controls operations of the printer unit 114. The memory 812 stores the programs, and data necessary for the CPU 811 executing the programs. The memory 812 may be a ROM and a RAM. The communication I/F 813 controls wireless communication. The communication protocol used by the communication I/F 813 is BLE. However, Wi-Fi or NFC may be used for example.

The expansion I/F 814 is electrically connected to an expansion cassette attached to the printer unit 114. Various types of expansion cassettes including the cassette 150 can be connected to the printer unit 114. When the cassette 150 functioning as an external power supply is attached to the expansion I/F 814, the expansion I/F 814 is electrically connected to the cassette 150, and electric power is supplied from the cassette 150 to the printer unit 114. When a cassette capable of selectively supplying a recording sheet among multiple types of recording sheets is connected, the expansion I/F 814 outputs a signal instructing a type of a recording sheet to the cassette.

The dial switches 130A and 130B can be operated in a similar manner. In the following, when the dial switches 130A and 130B are not distinguished, they are denoted as "dial switch 130".

Figure 9:
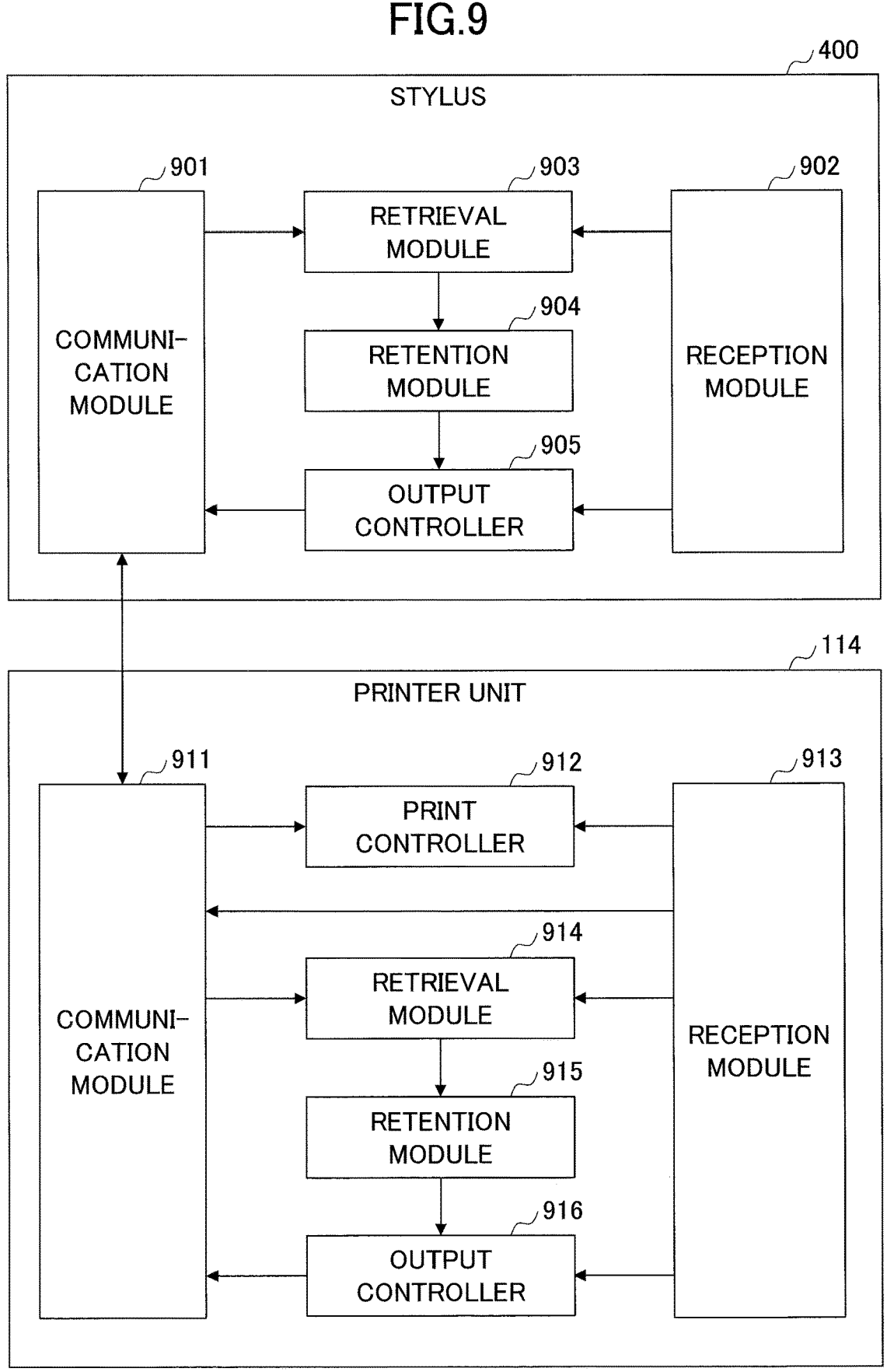
FIG. 9 is a block diagram illustrating a the printer unit and the stylus.

FIG. 9 is a block diagram illustrating a functional configuration of the printer unit 114 and the stylus 400. The stylus 400 includes a communication module 901, a reception module 902, a retrieval module 903, a retention module 904, and an output controller 905.

The communication module 901 controls communication with other devices such as the smartphone 200, the smartphone 300, and the printer unit 114. The communication module 901 controls connection, pairing, and data transmission/reception with other devices. Pairing is an operation for checking a header or a routing configuration by software in order to ensure connection security.

The reception module 902 receives a signal output from the dial switch 130B in response to an operation of the dial switch 130B, such as a copy operation, a paste operation, a print operation or a rotate operation.

If the dial switch 130B is pressed while an object displayed on the touch panel 203 is being selected by the stylus 400, the retrieval module 903 determines (settles) that the object is selected. If a copy operation signal is output from the dial switch 130B, the retrieval module 903 requests the smartphone 200 to upload the object, and acquires the uploaded object from the smartphone 200 in response to the request.

The retention module 904 retains an object acquired by the retrieval module 903 in the memory 802.

The output controller 905 outputs an object retained in the memory 802 in response to an operation of the dial switch 130B. If the dial switch 130B outputs a paste operation signal while a certain location on the touch panel 303 is being selected, the output controller 905 transmits an object in the memory 802 to the smartphone 300 to display the object at the selected location. If the dial switch 130B outputs a print operation signal while a printing function is being selected, the output controller 905 transmits a retained object to the printer unit 114 to print the object.

The printer unit 114 includes a communication module 911, a print controller 912, a reception module 913, a retrieval module 914, a retention module 915, and an output controller 916. The communication module 911 controls communication with the stylus 400. The communication module 911 controls connection, pairing, and data transmission/reception with the stylus 400. The print controller 912 performs a print operation by the print unit 120 using print data received from the stylus 400. The reception module 913 receives various operation signals from the dial switch 130A being presses and/or rotated. The retrieval module 914, the retention module 915, and the output controller 916 are respectively similar to the retrieval module 903, the retention module 904, and the output controller 905 in the stylus 400.

Figure 10:
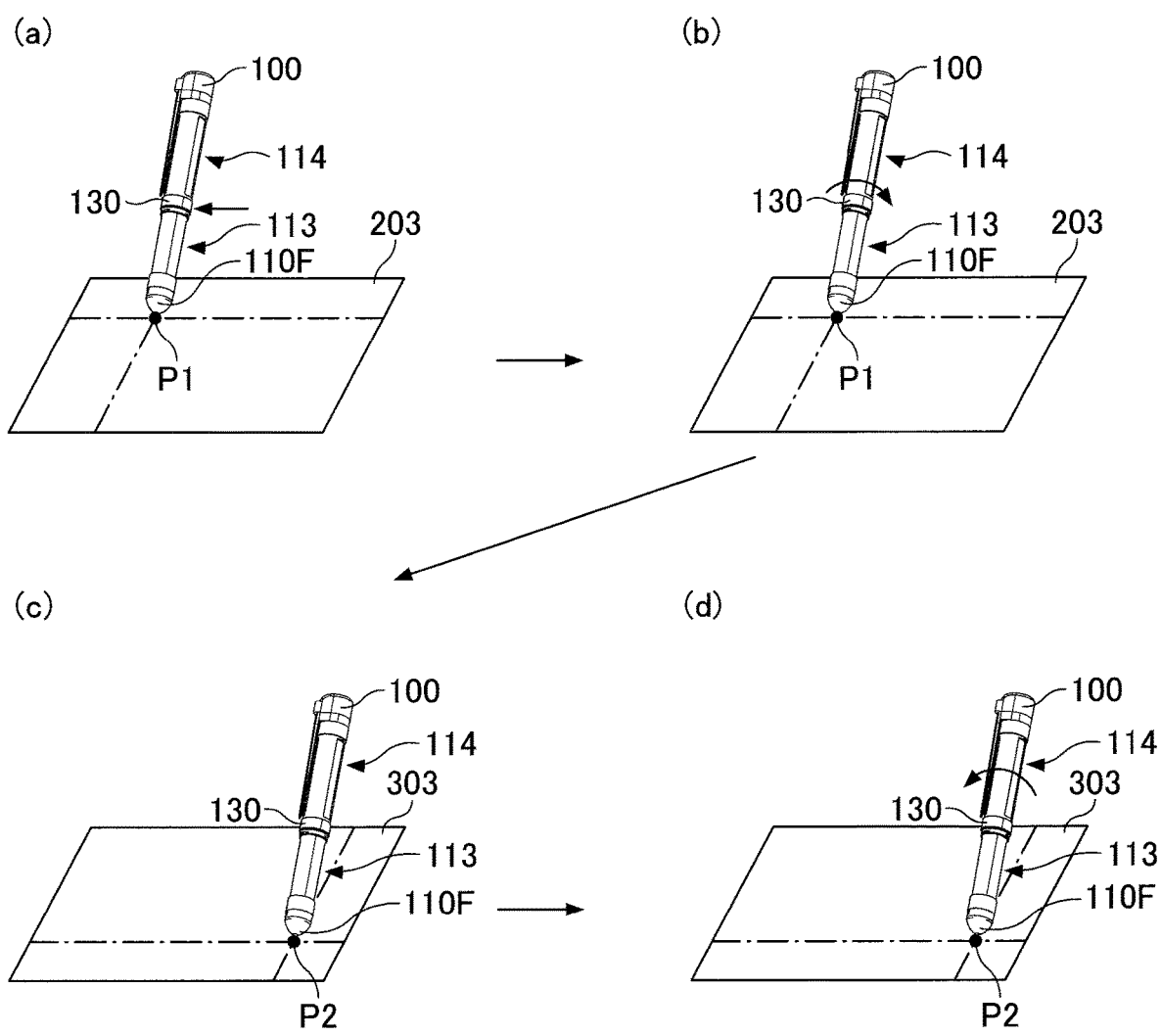
FIG. 10 is a diagram illustrating copy and paste operations using the terminal device.

FIG. 10 is a diagram illustrating copy and paste operations using the terminal device 100. In FIG. 10, the power supply unit 113 and the printer unit 114 are connected with each other. A pen-type cap 110F which is an example of a "touching part" is attached at a tip of the power supply unit 113. By using a tip of the cap 110F, a touching operation touching the touch panel 203 is performed. First, as illustrated in a diagram (a) of FIG. 10, an object displayed at a location P1 on the touch panel 203 is selected by using the cap 110F. The terminal device 100 reports a selection of the object to the smartphone 200 via wireless communication by pressing the dial switch 130, and the selection of the object is determined (settled). A single press operation may correspond to a copy operation, and a double-press operation may correspond to a cut operation. Instead of pressing the dial switch 130, settlement of selection may be achieved by a double-click operation on the touch panel 203, and by selecting a "select" button on a menu screen of the smartphone 200.

Next, as illustrated in a diagram (b) of FIG. 10, a request for transmitting the object is sent from the terminal device 100 to the smartphone 200 by rotating the dial switch 130 clockwise. In response to the request, the object is transmitted from the smartphone 200 to the terminal device 100 via BLE communication. Instead of rotating the dial switch 130, the object can be transmitted to the terminal device 100 by operating "copy" button on a menu screen of the smartphone 200. The terminal device 100 retains the received object in the memory 812.

Next, as illustrated in a diagram (c) of FIG. 10, a paste position P2 on the touch panel 303 at which the object is to be pasted is selected by using the tip of the cap 110F. By a double-press operation of the dial switch 130, the paste position P2 is settled. Subsequently, as illustrated in a diagram (d) of FIG. 10, by rotating the dial switch 130 counterclockwise, the object retained in the memory 812 is transmitted to the smartphone 300, and the object is displayed on the paste position P2. Instead of operating the dial switch 130, the object can be displayed at the paste position P2 by selecting "paste" button on a menu screen of a display unit.

The terminal device 100 can replicate an object on the touch panel 203 by pasting the object acquired from the location P1 on the touch panel 203 on a different location by the paste operation. The terminal device 100 can also copy an object to devices other than the smartphones 200 and 300.

Figure 11:
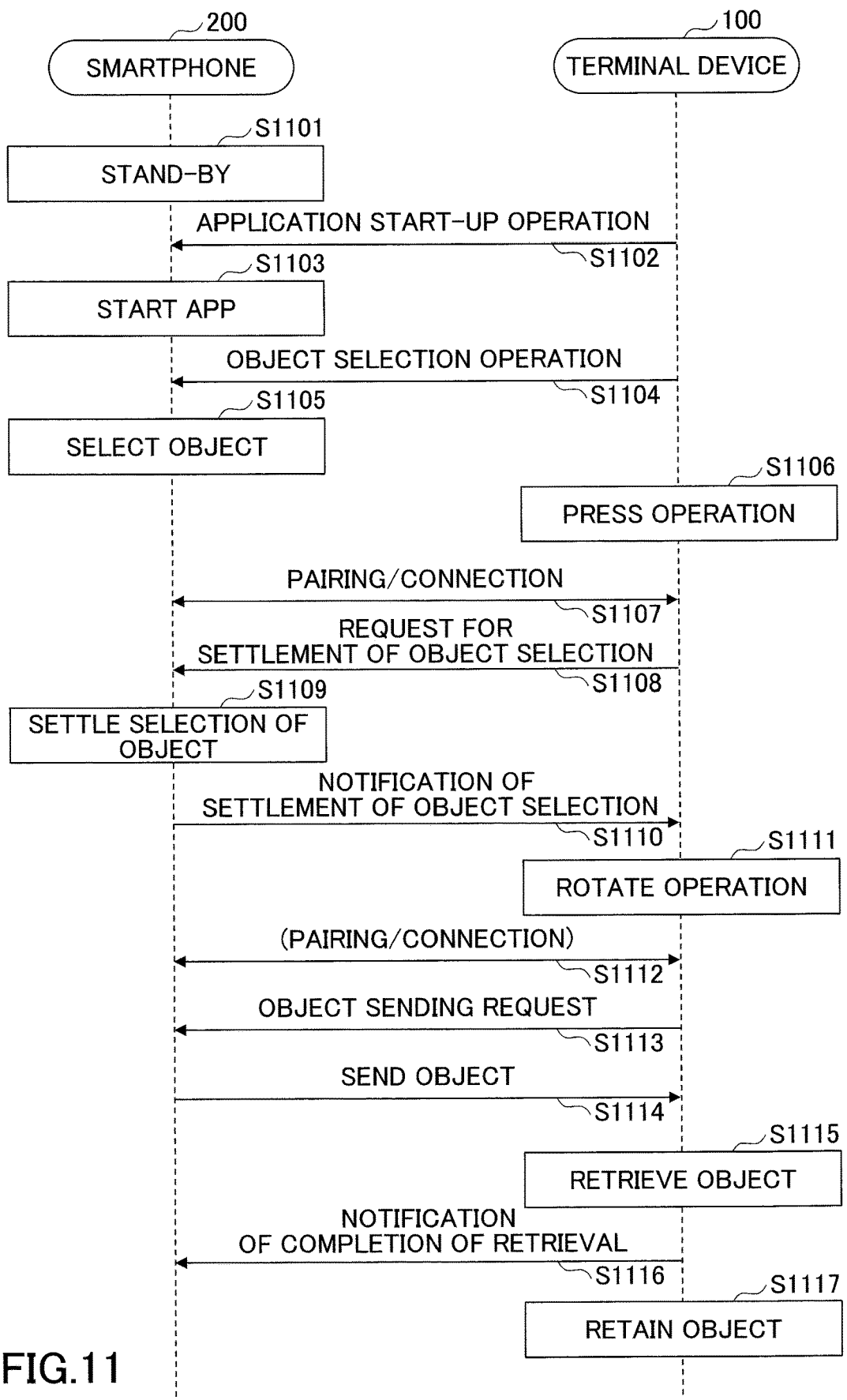
FIG. 11 is a diagram illustrating a sequence of a copy process performed by the terminal device and the smartphone.

FIG. 11 is a diagram illustrating a sequence of a copy process performed by the terminal device 100 and the smartphone 200.

First, the smartphone 200 is in a standby state (S1101). When the terminal device 100 performs a start-up operation of an application program (APP) of the smartphone 200 (S1102) while the smartphone 200 is in a standby state, the smartphone 200 starts the APP (S1103). Next, when an object displayed on a display unit is selected by touching the touch panel 203 (S1104), the smartphone 200 selects the object (S1105). Further, when the dial switch 130 is pressed (S1106), the terminal device 100 performs a pairing and connection for communication with the smartphone 200 (S1107), and transmits a request for settling the object selection to the smartphone 200 (51108). When the smartphone 200 receives the request from the terminal device 100, the smartphone 200 settles the object selection (S1109), and transmits a notification of the settlement to the terminal device 100 (S1110).

Next, when the dial switch 130 is rotated (S1111), the terminal device 100 performs a pairing and connection for communication with the smartphone 200 (S1112), and transmits a request for sending the object (S1113). When the smartphone 200 receives the request from the terminal device 100, the smartphone 200 transmits the object to the terminal device 100 (S1114). When the terminal device 100 receives the object from the smartphone 200 (S1115), the terminal device 100 sends a notification of completion of object retrieval (51116), and retains the object in the memory 802 (S1117).

Figure 12:
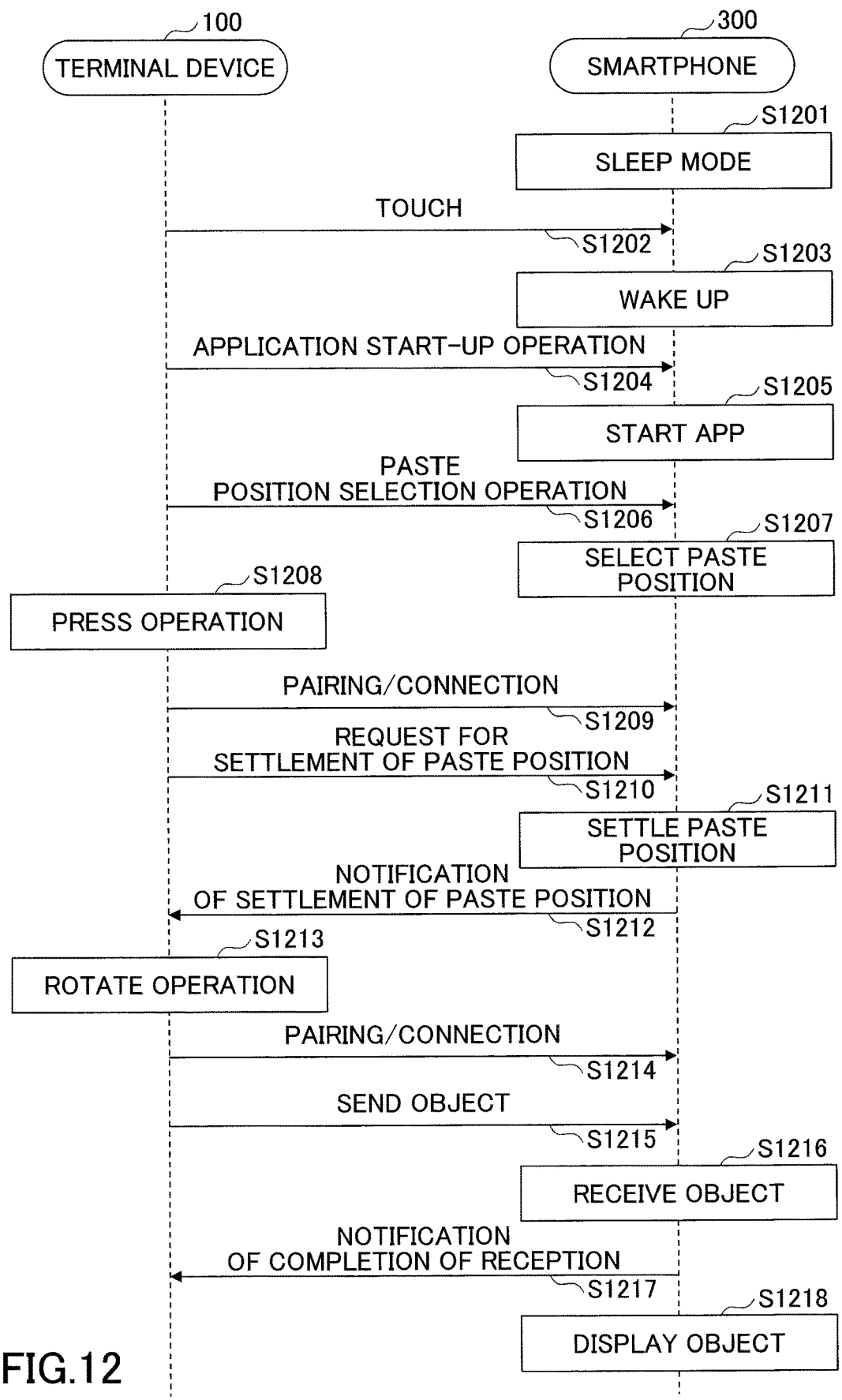
FIG. 12 is a diagram illustrating a sequence of a paste process.

FIG. 12 is a diagram illustrating a sequence of a paste process performed by the terminal device 100 and the smartphone 300.

First, the smartphone 300 is in a sleep state (S1201). When the cap 110F is touched on the touch panel 303 during the sleep state of the smartphone 300 (S1202), the smartphone 300 wakes up (S1203). When the terminal device 100 performs a start-up operation of an APP of the smartphone 300 (S1204), the smartphone 300 starts the APP (S1205). Next, when the touch panel 303 is touched to select a paste position (S1206), the smartphone 300 selects the touched location as a paste position (S1207). Further, when the dial switch 130 is pressed for settling the paste position (S1208), the terminal device 100 performs a pairing and connection for communication with the smartphone 300 (S1209), and transmits a request for settlement of the paste position to the smartphone 300 (S1210). When the smartphone 300 receives the request from the terminal device 100, the smartphone 300 settles the paste position (S1211), and transmits a notification of settlement of the paste position to the terminal device 100 (S1212).

Next, when the dial switch 130 is rotated for requesting for transmitting the object (S1213), the terminal device 100 performs a pairing and connection for communication with the smartphone 300 (S1214), and transmits the object to the smartphone 300 (S1215). When the smartphone 300 receives the object from the terminal device 100 (S1216), the smartphone 300 sends a notification of completion of object reception to the terminal device 100 (S1217), and displays the object to the paste position (S1218).

FIGS. 10 to 12 illustrate operations and processes performed by the terminal device 100 in a state in which the power supply unit 113 and the printer unit 114 are connected with each other. As the stylus 400 has similar functions with the printer unit 114, the stylus 400 connected to the power supply unit 113 can also perform the operations and the processes of FIGS. 10 to 12.

Figure 13:
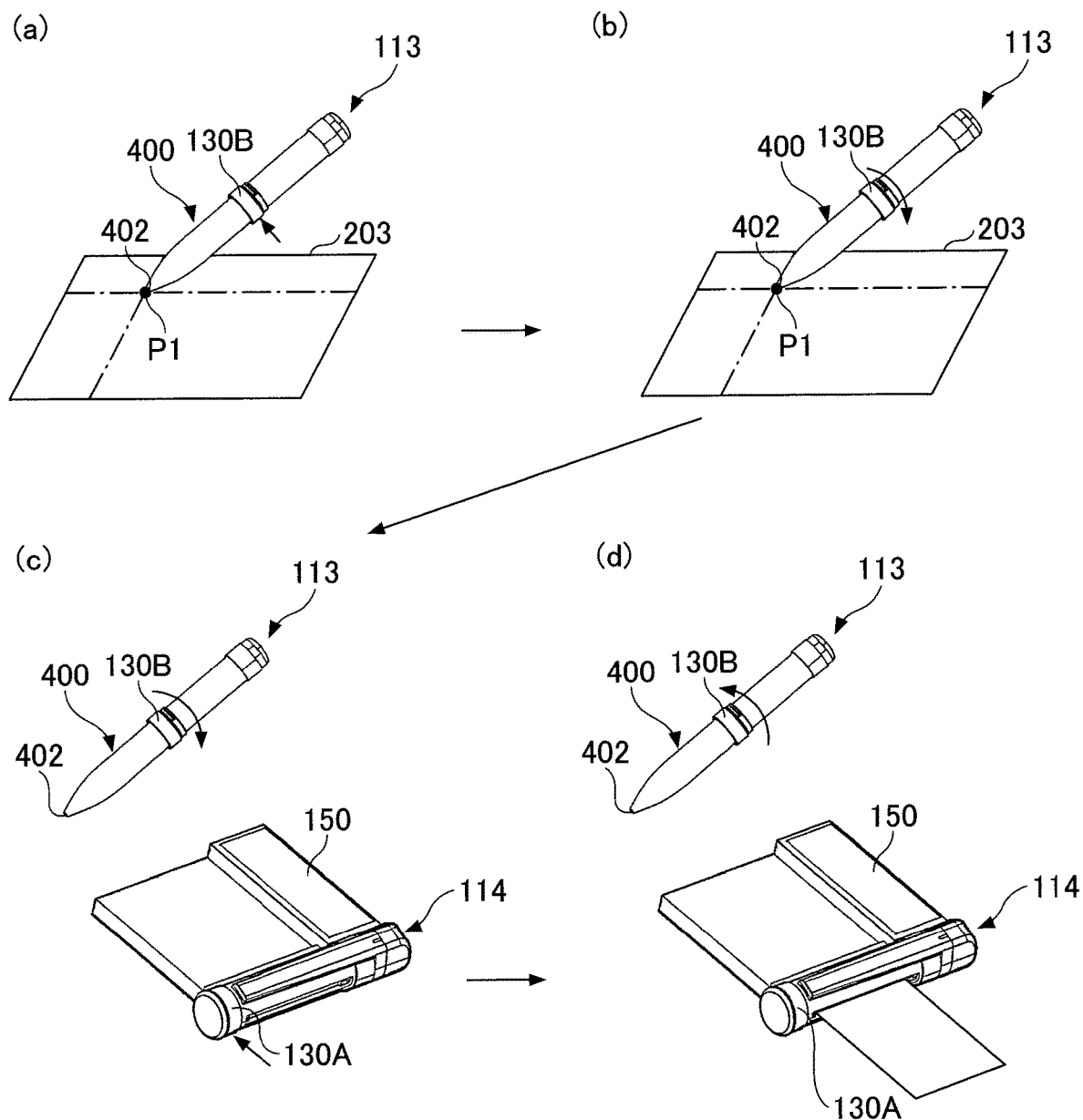
FIG. 13 is a diagram illustrating a print operation performed by using the stylus.

FIG. 13 is a diagram illustrating a print operation performed by the stylus 400. In FIG. 13, the power supply unit 113 and the stylus 400 are connected with each other. A touching operation is performed by using the tip 402 of the stylus 400.

First, an object displayed at a location P1 on the touch panel 203 is selected by using the tip 402, after the APP of the smartphone 200 is started by touching the touch panel 203 as illustrated in a diagram (a) of FIG. 13. Next, the object selection is settled by pressing the dial switch 130B. A single press operation may correspond to a copy operation, and a double-press operation may correspond to a cut operation. Alternatively, the settlement may be achieved by double-click operation on the smartphone 200 or by selecting a "select" button on a menu screen of the smartphone 200.

Next, as illustrated in a diagram (b) of FIG. 13, a request for transmitting an object is sent from the stylus 400 to the smartphone 200 by rotating the dial switch 130B clockwise. In response to the request, the smartphone 200 transmits the object to the stylus 400 via BLE communication. Alternatively, an object can be transmitted to the stylus 400 by selecting "copy" button on a menu screen of the smartphone 200. The stylus 400 retains the received object in the memory 802.

Next, the printer unit 114 is selected as a destination of print data, by a long press of the dial switch 130B and a rotation of the dial switch 130B after the long press, as illustrated in a diagram (c) of FIG. 13. Further, the destination is settled by a double-press of the dial switch 130B, and a request for permission to transmit print data is issued to the printer unit 114. In response to receiving the request, the indicator 132 starts blinking. When the dial switch 130A is pressed for a single time while the indicator 132 is blinking, transmission of print data is permitted. When the dial switch 130A is double-pressed while the indicator 132 is blinking, transmission of print data is rejected. With respect to an indicator of the stylus 400, red blinking represents that permission to transmit data is being requested, green lighting represents that data transmission has been permitted, and red lighting represents that data transmission has been rejected.

When transmission of the print data is permitted, the stylus 400 sends the print data in the memory 802 to the printer unit 114 in response to a counterclockwise rotation of the dial switch 130B as illustrated in a diagram (d) of FIG. 13, and causes the printer unit 114 to print the object.

By selecting other smartphones or other terminal devices as a data transmission destination, the stylus 400 can transmit the object in the memory 802 to the destination.

Figure 14:
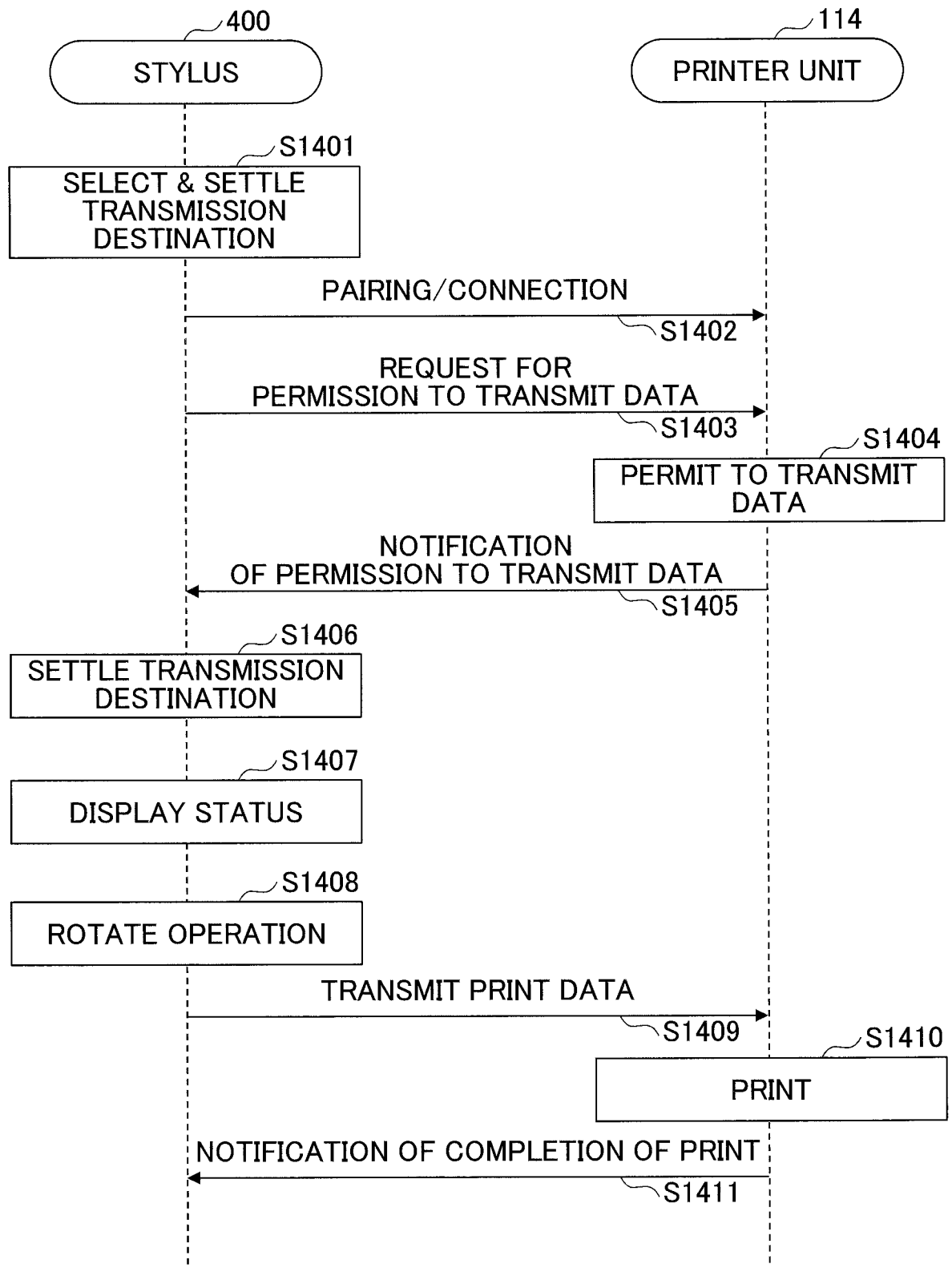
FIG. 14 is a sequence diagram illustrating a sequence of procedures of a print process.

FIG. 14 is a diagram illustrating a sequence of a print process performed by the stylus 400. An object retrieved from the smartphone 200 in a process similar to that illustrated in FIG. 11 is retained in the memory 802 in advance, before starting a process of FIG. 14. First, the printer unit 114 is selected as a destination of print data by a long press operation of the dial switch 130B and a rotation of the dial switch 130B after the long press. Then, the destination is settled by a double-press operation of the dial switch 130B (S1401). The stylus 400 performs a pairing and connection for communication with the printer unit 114 (S1402), and issues a request for permission to transmit print data to the printer unit 114 (S1403). When the dial switch 130A is pressed for a single time, the printer unit 114 permits transmission of print data (S1404), and sends a notification of permission to transmit print data (S1405). In response to the notification, the stylus 400 determines that the printer unit 114 is a data transmission destination (S1406) and the indicator of the stylus 400 is lit in green (S1407). Subsequently, when the dial switch 130B is rotated counterclockwise (S1408), the stylus 400 transmits the print data to the printer unit 114 via BLE communication (S1409). The printer unit 114 prints the object by using the transmitted print data (S1410), and sends a notification indicating completion of the print operation to the stylus 400 (S1411).

Figure 15:
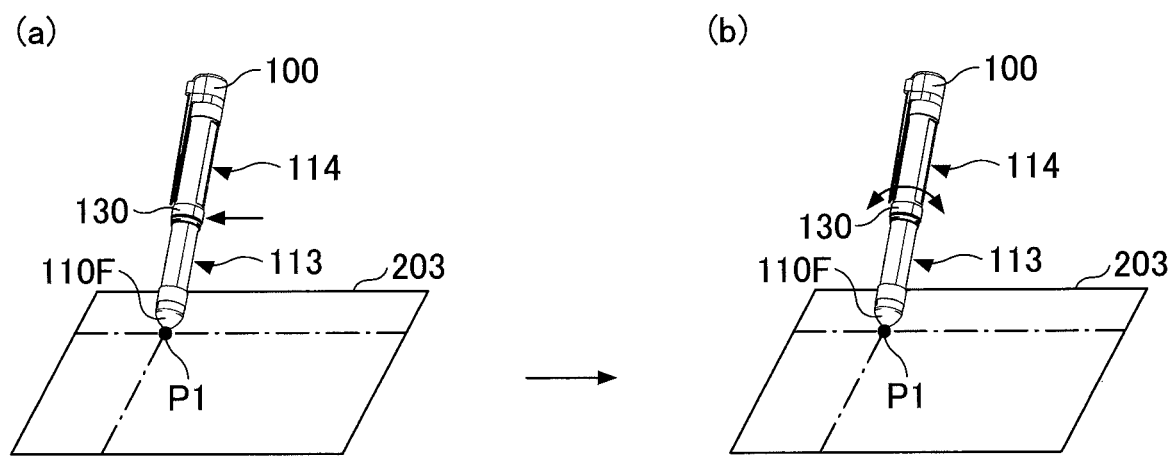
FIG. 15 is a diagram illustrating an object rotate operation using the terminal device.

FIG. 15 is a diagram illustrating a rotation operation using the terminal device 100. In FIG. 15, the power supply unit 113 and the printer unit 114 are connected. The cap 110F is attached to the power supply unit 113. First, as illustrated in a diagram (a) of FIG. 15, an object displayed at a location P1 on the touch panel 203 is selected. Further, by pressing the dial switch 130 for three times, selection of the object to be rotated is settled. Next, after a rotational axis of the object is selected by rotating the dial switch 130 as illustrated in a diagram (b) of FIG. 15, the object can be rotated at the location P1. When a center of the object is selected as a rotational axis, the object is rotated around the center. When an edge of the object is selected as a rotational axis, the object is rotated around the edge.

Figure 16:
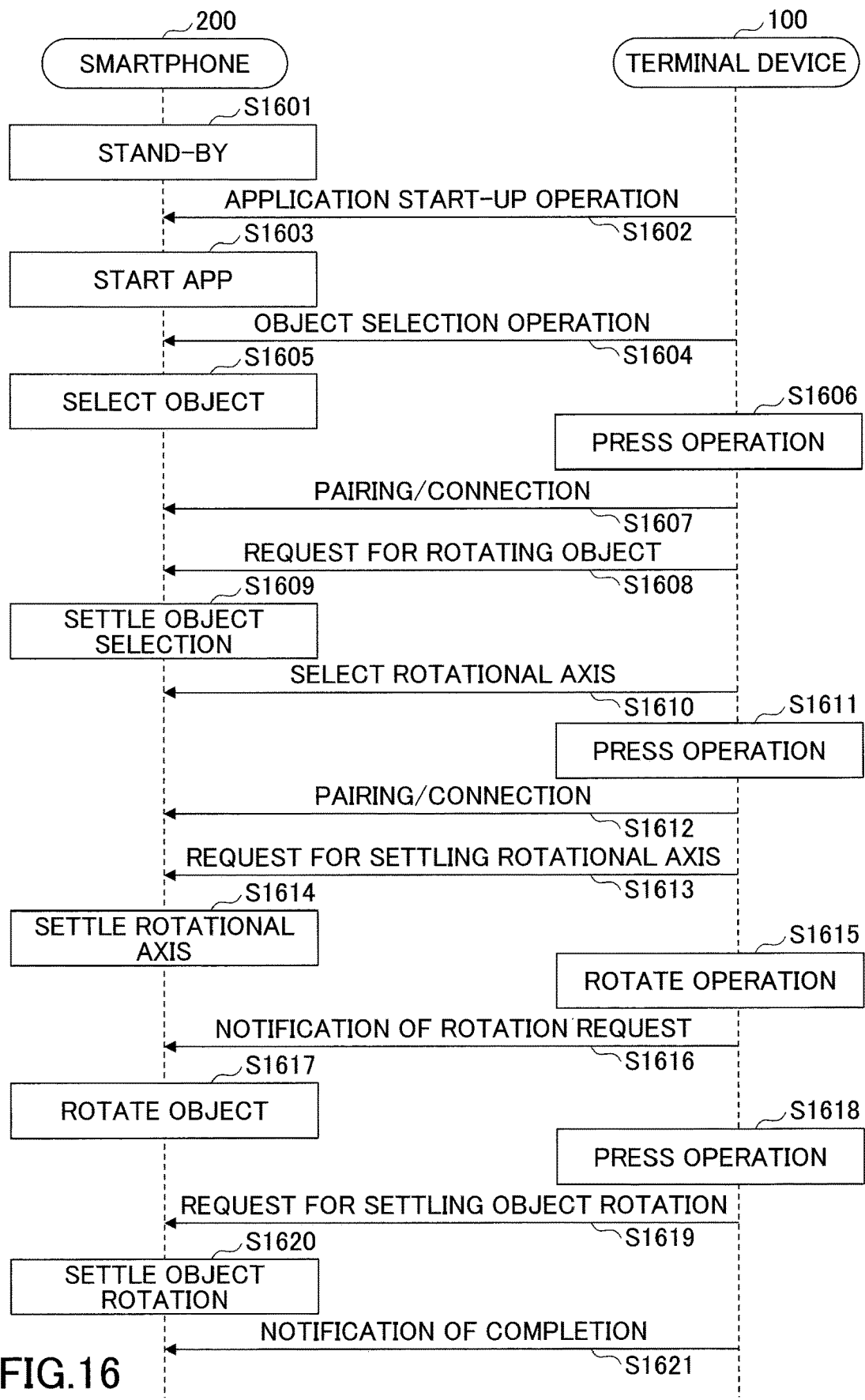
FIG. 16 is a diagram illustrating a sequence of an object rotation process.

FIG. 16 is a diagram illustrating a sequence of an object rotation process performed by the terminal device 100 and the smartphone 200. First, the smartphone 200 is in a standby state (S1601). When the terminal device 100 performs a start-up operation of an APP while the smartphone 200 is in a standby state (S1602), the smartphone 200 starts the APP (S1603). Next, when an object displayed on a display unit is selected by touching the object (S1604), the smartphone 200 selects the object (S1605). Then, when the dial switch 130 is pressed for three times (S1606), the terminal device 100 performs a pairing and connection for communication with the smartphone 200 (S1607), and transmits a request for rotating the selected object to the smartphone 200 (S1608). When the smartphone 200 receives the request from the terminal device 100, the smartphone 200 determines that the selected object is to be rotated (S1609).

Next, when a rotational axis of the object is selected by the terminal device 100 (S1610) and the dial switch 130 is pressed (S1611), the terminal device 100 performs a pairing and connection for communication with the smartphone 200 (S1612) and transmits a request for settlement of the rotational axis to the smartphone 200 (S1613). When the smartphone 200 receives the request from the terminal device 100, the smartphone 200 determines the rotational axis of the object (S1614).

Next, when the dial switch 130 is rotated (S1615), the terminal device 100 issues a request for rotating the object (S1616). When the smartphone 200 receives the request, the smartphone 200 rotates the object (S1617).

When the dial switch 130 is pressed (S1618), the terminal device 100 transmits to the smartphone 200 a request for settling the rotation of the object (S1619). When the smartphone 200 receives the request, the smartphone 200 settles the rotate operation (S1620), and sends a notification of completion of object rotation to the terminal device 100 (S1621).

FIGS. 15 and 16 illustrate processes of the terminal device 100 in which the power supply unit 113 and the printer unit 114 are connected. As the stylus 400 has similar functions with the printer unit 114, the stylus 400 can also perform the operations and the processes of FIGS. 15 and 16.

In the following, other functions of the terminal device 100a will be described.

The terminal device 100a can enlarge or shrink a displayed object by the following procedures. First, the object displayed on the display unit is touched by the terminal device 100a. Next, selection of the object is settled by pressing the dial switch 130. Lastly, the object is enlarged or shrunk on the touch panel 203 by a rotation of the dial switch 130.

The terminal device 100*a* can move an object on the display unit by the following procedures. First, the object displayed on the display unit is touched by the terminal device 100*a*. Next, the dial switch 130 is pressed while the object is touched by the terminal device 100*a* to select the object. Lastly, the selected object is moved on the display unit by dragging the terminal device 100*a* on the touch panel 203 while pressing the dial switch 130. A location of the object to be moved is settled when releasing the dial switch 130.

The terminal device 100*a* can clip a part of an image displayed on the display unit along with a selection frame such as a triangle frame, a square frame, or a circular frame, by the following procedures. First, a clipping function for clipping along a square frame is selected from a submenu. Next, four vertexes of a square frame along which an image is clipped are designated on the touch panel 203 by touching the four vertexes and pressing the dial switch 130 while touching the vertexes. Lastly, an area of the image to be clipped is determined when the dial switch 130 is pressed twice after the four vertexes are selected.

The terminal device 100*a* may receive print data from the smartphones 200 and 300 or from other terminal devices 100 and print the print data by using a method other than the aforementioned copy operation. Further, the terminal device 100*a* can perform a print operation even if communication with other devices is not established, by using print data stored in the memory 802 or 812.

The terminal device 100*a* can configure a group with one or more other devices such as smartphones, and can communicate with the other devices within the group using BLE communication (hereinafter, communication performed by devices within a group is referred to as "group communication"). The terminal device 100*a* may function as a master device and the other device may function as slave devices. Alternatively, the other device may function as a master device, and the terminal device 100*a* may function as a slave device. The terminal device 100*a* can share various data with the other device by the group communication.

The terminal device 100*a* can configure a group with one or more terminal devices 100B, and can perform group communication with the terminal devices 100B using BLE communication. The terminal device 100*a* may function as a master device, and the terminal devices 100B may function as slave devices. The terminal device 100*a* can share data with the terminal device 100B by group communication. Note that the terminal device 100B has similar functions with the terminal device 100. Thus, the terminal device 100B can print, or can perform group communication similar to the terminal device 100. The terminal device 100B can also perform group communication with smartphones within a group, or can function as a master device.

The terminal device 100*a* can configure a group with one or more sensor devices and perform group communication with the sensor devices using BLE communication. The terminal device 100*a* may function as a master device, and the sensor devices may function as slave devices. Types of the sensor devices are not limited to a specific type. Sensor devices may include a temperature sensor, an atmospheric pressure sensor, a position sensor, and an acceleration sensor. The terminal device 100*a* collects data detected by the sensor devices, such as temperature, atmospheric pressure, position, or acceleration, by group communication. The terminal device 100*a* can also store the data collected from the sensor devices ("detected data") into the memory 802 or 812, or can print out the detected data with the print unit 120. By printing out the detected data on a label sheet, the label sheet can be stuck on a notebook. The terminal device 100*a* can also output the detected data to the smartphone 200 or 300 or share the detected data with other devices by group communication.

The amount of data transmitted through the group communication can be reduced by using context data having a predetermined data structure and common objects which are shared among multiple devices stored in a library of each device.

For example, objects and object identifiers associated with the respective objects are stored in the library. The library also stores multiple position information and position identifiers associated with the respective position information. The terminal device 100*a* and the other devices of the same group maintain their own libraries. The terminal device 100*a* receives context data contains an object identifier specifying an object to be printed and a position identifier specifying a position on which the object is to be printed from the smartphone 200. Based on the object identifier and the position identifier in the context data, the terminal device 100*a* identifies the object and the position to be printed. The terminal device 100*a* performs synchronization between its library and a library of the smartphone 200 in advance to retain the object to be printed in its library. Thus, the terminal device 100*a* can retrieve the object to be printed from its library and print out the object, without receiving the actual object from the smartphone 200.

The terminal device 100*a* can synchronize its library with libraries of other devices of the same group. The terminal device 100*a* may transmit a local object stored in its own library to the other devices, and the other devices store the received object into respective libraries. The terminal device 100*a* may receive object stored in the libraries of the other devices and stores the object into its library. By performing these operations, the library of the terminal device 100*a* is synchronized with the libraries of the other devices.

The terminal device 100*a* can collect multiple objects that are used by common application programs by receiving multiple pieces of context data from other devices within the same group. Also, the terminal device 100*a* can combine the multiple objects and transmit the multiple objects to the other devices in a form of context data. Accordingly, each device of the same group can share the same data, and can display or print the data.

Figure 17A:
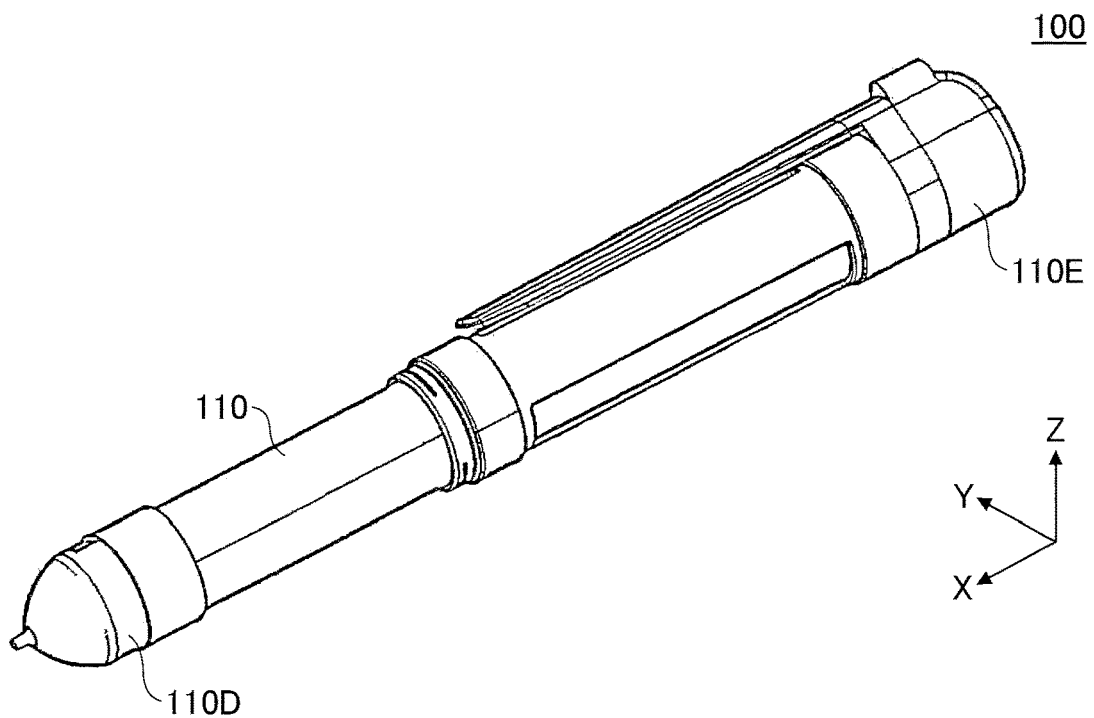
FIGS. 17A and 17B are diagrams illustrating the terminal devices to which the extension units are attached.
Figure 17B:
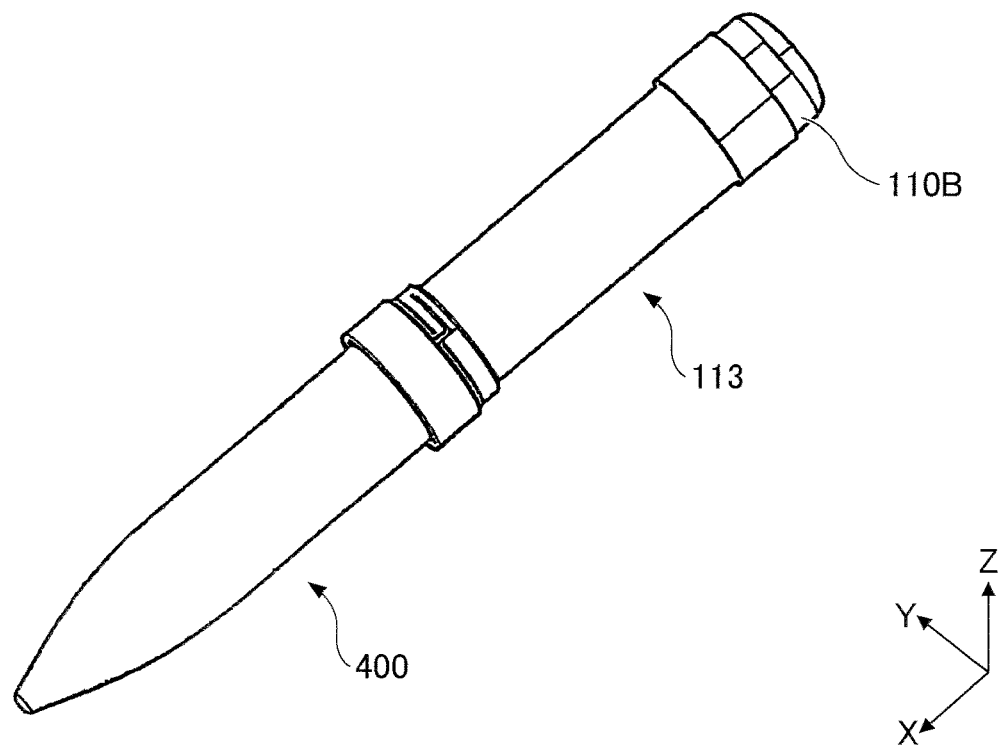

Various types of extension units can be attached to the terminal device 100. FIGS. 17A and 17B are diagrams illustrating examples of the terminal devices 100 to which the extension units are attached. In FIG. 17A, a detachable extension unit 110D is provided at +X end of the housing 110. Also, at the other end of the housing 110, a detachable extension unit 110E is provided.

The extension unit 110D is a nib unit. A writing instrument such as a ball-point pen is provided at the extension unit 110D, and a tip of the writing instrument projects from a tip of the extension unit 110D. By attaching the extension unit 110D to the terminal device 100, a user can write on a printed recording sheet or on a notebook, with the extension unit 110D. By attaching the extension unit 110D, the terminal device 100 may have a writing function in addition to a printing function and a communication function. A user can handwrite a comment on the printed label on a scrapbook or a notebook, and the terminal device 100 will be a functional and effective file management tool.

The extension unit 110E is a laser pointer unit. A laser unit is provided inside the extension unit 110E, and a hole for emitting laser light is also provided. By attaching the extension unit 110E to the terminal device 100, laser light from the extension unit 110E can be emitted to objects to be pointed such as a whiteboard. By attaching the extension unit 110E, the terminal device 100 may have a laser pointer function in addition to a printing function and a communication function. The extension unit 110E is electrically connected to the terminal device 100 via a connection terminal, and the laser unit can be controlled by operating the dial switch 130.

In FIG. 17B, the stylus 400 is connected to the power supply unit 113 separated from the printer unit 114. By connecting the power supply unit 113 to the stylus 400, a touching operation on a touch panel can be performed with the tip 402, and the stylus 400 can operate by electric power from the power supply unit 113. Various types of extension units can be attached to the power supply unit 113 instead of the cap 110B.

When printing out an object on a label sheet, the terminal device 100 can change a size of the label sheet in accordance with a size of the notebook. The size of the label sheet can be changed by changing types of the cassette 150, or by changing the size of the label sheet stored in the cassette 150. When multiple sizes of label sheets can be stored in the cassette 150, the terminal device 100 selects a size of a label sheet in accordance with the notebook.

The terminal device 100a includes a switching unit for switching an operation mode of the terminal device 100a between a master mode and a slave mode. The terminal device 100a functions as a master device when the terminal device 100a is in the master mode, and functions as a slave device when the terminal device 100a is in the slave mode. The switching unit may switch the operation mode by an operation of the dial switch 130. The terminal device 100a may initially functions as a slave mode, and can be changed to a master mode when the dial switch 130 is operated. The operation mode is retained even if the terminal device 100a is turned off. If the terminal device 100a in a master mode is turned off, the terminal device 100a functions in a master mode when the terminal device 100a is turned on. If the terminal device 100a in a slave mode is turned off, the terminal device 100a functions in a slave mode when the terminal device 100a is turned on. When an operation for turning off power supply is made while the terminal device 100a is performing an operation for changing the operation mode, the terminal device 100a does not turn off immediately. The terminal device 100a maintains a power-on state until the operation mode change is completed. After the operation mode change is completed, the terminal device 100a notifies a user of the completion of the operation mode change with the indicator 132, and is then turned off.

The terminal device 100a may include a collection unit, a generation unit, and a distribution unit as a function set of group communication. When the terminal device 100a is in the master mode, the collection unit collects data for an application program in a form of context data from slave terminal devices 100 or slave styluses 400 of the same group via group communication. The collection unit may collect data for a print application or for an SNS application from the slave device. The generation unit generates data for an application program, such as data for a print application or data for an SNS application, by using the data collected by the collection unit. The distribution unit distributes the data for the application program generated by the generation unit such as data for a print application and an SNS application to slave device.

The terminal device 100a includes a management unit for group communication. The management unit manages information including a group ID and a list of users belonging to each group. When the terminal device 100a is in the master mode, the terminal device 100a selects one group for group communication among the groups managed by the management unit by an operation of the dial switch 130. The master terminal device 100a configures a group by connecting with other devices belonging to the selected group.

The terminal device 100a according to the present embodiment can acquire an object from the smartphone 200 easily by operating the dial switch 130. The terminal device 100a can also manipulate the acquired object. Thus, the terminal device 100a can utilize the object in multiple purposes.

Although the preferred embodiments of the present invention have been described above, the present invention is not limited to these embodiments. Various modifications and enhancements may be made without departing from the scope of the present invention.

What is claimed is:

1. A terminal device comprising:
   a first main unit, including
      a first operation part,
      a touching part configured to touch a touch panel,
      a first communication module, and
      a first retrieval module configured to retrieve an object displayed on the touch panel of a first external apparatus, in response to an operation of the first operation part made while the object is selected by the touching part;
   a second main unit, including
      a second operation part,
      a second communication module,
      a second retrieval module configured to retrieve an object displayed on the first external apparatus, in response to an operation of the second operation part made while the object is selected by the touching part, and
      a printing unit configured to print the object retrieved by the first retrieval module or the second retrieval module; and
   a power supply unit connectable to both the first main unit and the second main unit;
   wherein the first main unit and the second main unit are communicable with each other.

2. The terminal device according to claim 1, wherein an expansion cassette for expanding a function of the printing unit is attachable to the second main unit; and
   the second main unit is operable by receiving electric power from an external power supply included in the expansion cassette, in a case in which the expansion cassette is attached to the second main unit and the power supply unit is not attached to the second main unit.

3. The terminal device according to claim 1, wherein
   the first main unit includes a first output control module configured to transmit the object retrieved by the first retrieval module to a second external apparatus via the first communication module, and to cause the second external apparatus to display the object at a selected position on a display of the second external apparatus; and
   the second main unit includes a second output control module configured to transmit the object retrieved by the second retrieval module to the second external apparatus via the second communication module, and to cause the second external apparatus to display the object at a selected position on the display of the second external apparatus.

4. A communication system comprising:
a first apparatus including a touch panel on which an object is displayed;
a first terminal device including
an operation part,
a touching part configured to touch the touch panel,
a first communication module, and
a retrieval module configured to retrieve the object displayed on the first apparatus from the first apparatus, in response to an operation of the operation part made while the object is selected, by the touching part, on the first apparatus; and
a second terminal device including
a printing unit,
a second communication module, and;
a power supply unit connectable to both the first terminal device and the second terminal device;
wherein the first terminal device and the second terminal device are communicable with each other,
the first terminal device is configured to transmit the retrieved object to the second terminal device, and
the second terminal device is configured to print, by using the printing unit, the object received from the first terminal device.

5. The communication system according to claim 4, further comprising a second apparatus; wherein
the first terminal device includes an output control module configured to transmit the object retrieved by the retrieval module to the second apparatus, and
the second apparatus is configured to display the object received from the terminal device at a selected position on its display unit.

\* \* \* \* \*